Jan. 15, 1952  R. J. BRINKEMA  2,582,228
METHOD OF PRODUCING CELLULAR RESINOUS COMPOSITIONS
Filed Oct. 29, 1946  2 SHEETS—SHEET 1

Inventor
Robert J. Brinkema,
By
Attorney

Jan. 15, 1952 R. J. BRINKEMA 2,582,228
METHOD OF PRODUCING CELLULAR RESINOUS COMPOSITIONS
Filed Oct. 29, 1946 2 SHEETS—SHEET 2

Inventor
Robert J. Brinkema,
By
Attorney

Patented Jan. 15, 1952

2,582,228

UNITED STATES PATENT OFFICE 2,582,228

METHOD OF PRODUCING CELLULAR RESINOUS COMPOSITIONS

Robert Jacob Brinkema, Kew Gardens, N. Y., assignor, by mesne assignments, to Koppers Company, Inc., a corporation of Delaware Application October 29, 1946, Serial No. 706,467

24 Claims. (Cl. 18—48)

The present invention relates to the production of a rigid cellular low density dihydroxy benzene-aldehyde or a dihydric phenol-aldehye resinous composition, as for example, a permanently fusible resorcinol-formalehyde resin or a copolymer monohydroxy dihydroxy benzene-aldehyde resin, as for example, a permanently fusible phenol-resorcin-formaldehyde resin, said resinous composition being characterized by the property of setting to its rigid non-collapsible foamed state at room temperature. Resinous compositions of this character have the further property of gelling in a short period of time to a rubbery mass which may be set in said rubbery shape without the collapse of the gas bubbles present in the intermediate foamed structure prior to the final setting of the foamed structure to its insoluble infusible state.

It has hitherto been proposed to form a foamed resinous mass from phenol-formaldehyde condensation product, as for example, one produced from phenol per se ($C_6H_5OH$) on condensation with formaldehyde, but the setting of such a foamed structure has usually had to be carried out in the presence of heat. In this connection it may be pointed out that said resins cannot satisfactorily be set at room temperature if the phenol-formaldehyde resins are a fluid at room temperature. At the time the gas-producing or foaming reaction has expended itself, and therefore, the bubbles of gas are not entrapped but escape from the fluid phenol-aldehyde condensation product with the resultant collapse of the foam. In other words, the monohydroxy phenol-aldehyde resins, as for example, phenol-formaldehyde resins, do not gel to a rubbery structure at room temperature within a time period short enough to entrap the foam-producing gas bubbles. Ultimately the monohydric phenol-aldehyde resins do gel to a rubbery structure, but by this time the foam-producing gas bubbles have escaped from the resin and the latter collapses.

The monohydric phenol-aldehyde resins can, of course, be made to set at room temperature by incorporating at room temperature sufficient amounts of acids to set the resin at room temperature. This, however, requires such large proportions of acid as to result in a structure which would be highly corrosive to any surface attacked by acids including cellulosic materials.

The principal object of the present invention is to produce a light-weight rigid resin material comprising a set and hardened foam containing a multiplicity of voids defined by walls comprising a phenolic resin containing a dihydric phenol aldehyde component, the ratio of the aldehyde to the total phenolic body being less than 1:1.

The resin may comprise the set condensation product of a dihydric phenol, as for example, resorcinol and a resin-forming aldehyde, or the copolymer condensation product of a monohydric phenol, a dihydric phenol and a resin-forming aldehyde; or a mixture of a condensation product of a dihydric phenol and a resin forming aldehyde with a condensation product of a monohydric phenol and a resin-forming aldehyde; or a mixture of a copolymeric condensation product of a monohydric phenol, a dihydric phenol, and a resin forming aldehyde with the condensation product of a monohydric phenol and a resin forming aldehyde; or a mixture of a copolymeric condensation product of a monohydric phenol, a dihydric phenol and a resin-forming aldehyde with the condensation product of a dihydric phenol and a resin-forming aldehyde; or a mixture of two different copolymeric condensation products each containing a copolymer of a monohydric phenol, a dihydric phenol, and a resin forming aldehyde, all of said phenolic condensation products being permanently fusible; that is, the ratio of the aldehyde to the total phenolic body used to produce the condensation product is less than 1:1.

The rigid cellular low density permanently fusible resinous composition may include a mixture of (a) a dihydric phenol-aldehyde resin with a monohydric-aldehyde resin, (b) a mixture of a copolymer dihydric phenol, monohydric phenol-aldehyde resin with monohydric phenol-aldehyde resin; and (c) a mixture of a copolymer dihydric phenol, monohydric phenol-aldehyde resin with a dihydric phenol-aldehyde resin.

While any of the resinous composition or mixtures of resinous compositions herein set forth are produced to have a pH below 2.5 or above 6, it is within the province of the present invention to utilize a permanently fusible resin having a pH above 2.5 or below 6, and add thereto sufficient acid or alkaline material during the foaming operation to alter the pH to below 2.5 or above 6, sufficient additional acid or alkali being added to produce the foaming reaction as herein set forth.

It is an additional object of the present invention to provide a method of producing a cellular composition comprising forming a water-containing mixture of a permanently fusible resin of the character herein set forth, said resin containing a dihydric phenol-aldehyde constituent, the resin being a straight resin or copolymer resin or a mixture resin, one of the components being a dihydric phenol-aldehyde resin, the ratio of the aldehyde to the total phenolic body of the resin material being less than 1:1; gas producing ingredients and an aldehyde setting agent in an amount to set the permanently fusible resin while maintaining the pH of the water-containing mixture below 2.5 or above 6, or maintaining the pH of the resin body below 2.5 or above 6; and setting the reaction mixture at a temperature between 40° F. and 120° F., prior to escape of the gaseous medium generated by said gas-producing ingredients.

Another object of the present invention is to provide a substantially completely gelled and moldable plastic rubbery mass, capable of being set or hardened, comprising an expanded resin containing a multiplicity of voids defined by walls of the resins above set forth including the set condensation product of a dihydric phenol, as for example, resorcinol, catechol, hydroquinone, or the like, and a resin-forming aldehyde; or a copolymer condensation product of a monohydric phenol, a dihydric phenol of the character above set forth, and a resin-forming aldehyde, said mass being capable of being shaped while in a rubbery state, the shaped mass having the property of being converted into a rigid state.

Still another object of the present invention is to produce articles containing the gelled or rigid expanded resinous material above set forth and to produce articles having associated therewith expanded resinous materials, as above set forth, the expanded set or cured resinous masses acting as cores, as for example, in the production of laminated articles including plywood articles or in the production of buoyant articles of manufacture such as boats.

It is an additional object of the present invention to provide a method embodying the steps set forth wherein the reaction mixture is set at room temperature and prior to the escape of the gaseous medium generated by the gas-producing ingredients. Usually the setting temperature will vary between 60° F. and 120° F., and preferably between 75° F. and 120° F. The temperature of cold setting will, of course, vary somewhat depending upon the various conditions.

In the broad aspect of the present invention it is recognized that the plastic resin mass containing the gas-producing ingredients may be set at higher temperatures, as for example, at temperatures varying from 150° F. to 200° F. or even higher, as for example, up to 260° F. When employing temperatures of 150° F. to 200° F. the foamed plastic mass can be set in a period of time varying from a half hour to two hours or even a shorter time. However, in the preferred form of the invention the expanded resinous mass is cold set.

It is an additional object of the present invention to provide a mixture of the character above set forth in which there is incorporated a retarding agent which is incapable of vaporizing from the foamed gelled resin at the setting and curing temperature of the expanded resin, said gas-retarding agent preventing the gas bubbles present in the liquid resin from escaping during the time the resin is in the liquid state and prior to the time the resin mass has attained substantial gel structure.

The present invention will be described in connection with the accompanying drawing wherein.

The present invention will be illustrated by the following specific examples:

*Example 1*

A mixture of a copolymer phenol-resorcinol-formaldehyde resin having a pH of 1.5 to 2 in a 50% water solution is mixed with glycerine and water in accordance with the following:

| | Grams |
|---|---|
| Copolymer phenol-resorcinol-formaldehyde permanently fusible resin containing 1 mol of phenol for each mol of resorcinol | 100 |
| Glycerine | 25 |
| Water | 25 |

The above ingredients are thoroughly mixed at room temperature to provide a syrup to 90 grams of which there is added 30 grams of a 37% solution of formaldehyde in ethylene glycol. The so-treated syrup is agitated by means of a suitable agitating device and, thereafter, there is added to the solution of the copolymer resin and the setting agent 3 grams of a finely divided alkali capable of generating gas, as for example, finely divided sodium carbonate. While the alkali gas generating medium is being added, the mixture is thoroughly stirred and when the sodium carbonate has been substantially evenly dispersed in the solution there is added 12 grams of phosphoric acid or the equivalent amount of another acid which will act upon the gas-producing medium and liberate finely divided bubbles of gas throughout the entire resinous mass and cause the resinous mass to greatly expand preferably to at least four times its original volume. The copolymer permanently fusible phenol-resorcinol formaldehyde resin may be made by the following procedure:

| | Grams |
|---|---|
| Phenol | 1128 |
| 37% formaldehyde solution | 660 |
| Solid oxalic acid crystals | 35 |
| Water | 50 |
| Resorcinol | 1320 |
| 37% formaldehyde solution | 660 |

The phenol is melted and introduced into a kettle provided with a reflux condenser. To the phenol there is first added 660 grams of the formaldehyde solution. The oxalic acid is dissolved in 50 grams of water. While the contents of the kettle are being stirred the resulting oxalic acid solution is added. The contents of the reaction kettle are gradually warmed to the reflux state and maintained there at a temperature from 95° C. to 98° C. until the reaction proceeds to the point where the formaldehyde is substantially all tied up with the phenol.

Separately the 1320 grams of resorcinol are dissolved in 660 grams of the 37% formaldehyde solution. Usually solution will occur without heating, but sometimes slight warming is necessary. This should not be sufficient to cause any reaction between the resorcinol and the formaldehyde. When warming is necessary the temperature should not exceed 40° C. to 50° C. Care should be taken, however, to cool the formaldehyde solution of the resorcinol immediately after the resorcinol has been dissolved in order to prevent any reaction occurring between the resorcinol and the formaldehyde. The resorcinol solution is advantageously cooled to between 0° C. and 30° C., and the solution is maintained in a cooled state and thereafter added to the reaction product in the kettle. The cooled solution of resorcinol and formaldehyde is added to the kettle through the reflux just rapidly enough to maintain steady reflux of the contents of the kettle.

After all of the resorcinol-formaldehyde solution has been combined with the monohydroxy phenol-aldehyde condensation product, the mixture is maintained under reflux conditions to insure that substantially all of the formaldehyde or other aldehyde present is tied up. In other words, there should be desirably no free formaldehyde at this stage of the condensation reaction. Usually 10 to 15 minutes are sufficient to obtain substantial elimination of all free formaldehyde.

Thereafter the water present in the composite copolymer product is removed by vacuum distillation. During the course of the dehydration step between 1100 and 1200 grams of liquid are removed, and of this amount a small proportion, as for example, 2½ to 3½ is crude unreacted phenol. The dehydrating step is carried out until the liquid resinous mass in the kettle has a water content between .5% to 1.0%. This dehydration step is of importance as it assures production of resorcinol-formaldehyde polymers of essentially the same polymer size throughout the mass of the resinous material.

To 100 grams of the liquid resinous mass dehydrated as above set forth there is then added first the glycerine and then the water. The solution is allowed to cool to atmospheric temperature, that is, between 40° F. and 120° F. and preferably to around 77½° F., and thereafter the setting agent and the gas-producing ingredients are added in the manner above set forth. It is to be noted that during the preparation of the monohydric phenol-formaldehyde resin an oxalic acid catalyst was used in an amount which conferred upon the copolymer resinous mass a pH varying from about 1½ to about 2 when dissolved in an equal weight of distilled water.

By maintaining the pH of the copolymer phenol - resorcinol - formaldehyde resin below about 2.5 or above about 6 the resin becomes sufficiently reactive so that it will set in the cold upon the addition of a formaldehyde-liberating setting agent; that is, it will set at a temperature between about 40° F. and 120° F. and preferably between 60° F. to 120° F. within a time period of from 12 to 24 hours. In other words, the liquid resin will change from its liquid state to a solid state in a time period varying from 12 to 24 hours. Unless the pH is controlled as above set forth the time in which the copolymer resin will gel will be much greater requiring several days to assume the gel state. There is, of course, some setting during this gelling period. The above statement refers to the gelling of a copolymer resin of the character set forth in which there has been incorporated 10% to 30% of a retarding medium which depresses or slows down the gel-forming reaction and also preferably imparts plasticity to the resin. It retards, depresses, or slows down the gel-forming reaction due to the relative inertia of the glycerine molecule as compared with that of water. In other words, the kinetic energy or chemical reaction rate of the solution is modified. Instead of using glycerine there may be used a retarding agent which will effect the slowing up of the gelling reaction so that the resinous mass does not start to gel for anywhere from 15 to 35 or 40 minutes after it is made. Materials which may be used in place of the glycerine are ethylene glycol, diethylene glycol, propylene glycol, cyclohexanol, terpineol, glycerol or glycol ethers such as methyl, ethyl or propyl Cellosolve, higher boiling alcohols such as 2-ethylbutanol methylamyl alcohol, heptanol-2, and similar materials.

The amount of water present in the resin syrup, one formulation of which has been set forth in Example 1, may be varied over a fairly wide range; however, it is desirable that the water be present in a sufficient amount to allow the gelling or curing action to proceed inasmuch as the acid catalyst used to make the resin cure at room temperature which, as specifically set forth, is oxalic acid, must ionize in order to catalyze the reaction. It is also desirable that the water or other liquid solvent be present in a sufficient quantity to make the mixture fluid and allow throughout the mass adequate mixing of gas-forming or bubble-forming ingredients which in the specific example set forth comprise sodium carbonate and phosphoric acid. In one form of the invention the resinous composition including the gas producing medium is maintained fluid enough to be readily poured into any cavity which it is desired to fill.

Instead of using water there may be substituted for the water a mixture of water and alcohol, the alcohol present in the mixture varying from 10% to 75%; however, the most satisfactory results are obtained in a straight or substantially straight aqueous medium.

While in Example 1 the gas-producing ingredients are stated to be sodium carbonate and phosphoric acid, the sodium carbonate is broadly representative of a base material, and the phosphoric acid is broadly representative of an acid material, said materials when acting one with the other generating a gas or bubbles of gas. Instead of using the alkali carbonates as one of the gas producing ingredients, it is within the province of the present invention to use the alkaline earth metal carbonates, as for example, calcium, strontium, barium, and magnesium. Potassium and lithium carbonates may also be used. Zinc carbonate may be used. In short, any of the carbonates may be used which when reacted with an acid will produce carbon dioxide gas. Instead of phosphoric acid any of the strong mineral acids may be used such as sulfuric acid, hydrochloric acid, and the like.

The retarder which in Example 1 is glycerine may as stated be substituted by equivalent materials. In general, it is desired to point out that sufficient glycerine must be present to prevent the gas bubbles from bursting or escaping during the time in which the mass is in the free flowing liquid state and prior to the time at which the mass has attained substantial gel structure. Further, the retarder must be present in an amount which will keep the resinous composition in a shapable or formable rubber-like state.

The retarder preferably has a boiling point above 248° F. so that when the resinous composition is cured even at room temperatures or at higher temperatures, as for example, 150° F. the retarder will not vaporize from the foamed gel and cause shrinkage in the gel prior to curing or during curing or in the substantially fully cured structure. The resinous composition, that is the resin of the character set forth or its equivalent, and the water and the retarder should, before the addition of the gas producing ingredients, have a viscosity varying between about R and U measured on the Gardner-Holdt viscosity scale.

In one form of the invention it is of importance that the amount of alkaline gas-liberating agent be added in predetermined proportions from the standpoint of two fundamental considerations. If the alkaline substance, as for example, sodium carbonate is added in sufficient quantity to bring the effective pH of the resin, that is the resin pH determined in a 50% water solution, from about 1.5 to 2 into a pH range from about 2.5 to 6, even though the acid component of the gas-producing medium has already been added to the resinous composition, the gel time of the resinous composition will be so long with respect to the gas-forming reaction, that the resinous mass will be fluid long after the gas-forming reaction has expended itself, and thus the gas bubbles, instead of being entrapped, will escape from the so-compounded mass, and the foam structure will collapse.

If, on the other hand, the amount of acid such as phosphoric acid added to produce the foam is too great, this large proportion of acid will speed up the gel formation of the resin so greatly that the resinous mass will gel before the foam is produced, and then there will result a solid gelled, cooled mass.

The fluid resin composition will, of course, have incorporated therein sufficient base and acid, or equivalents herein designated "gas-producing ingredients" to produce a sufficient amount of gas bubbles to expand the mass to at least four times its known volume. While this amount of gas-producing ingredient must be incorporated in the fluid resinous mass, further control must be exercised over the amount of the gas-producing ingredients which are incorporated in said resinous mass.

In the more specific aspect of the invention it is desired that the resinous composition have a gel time not exceeding 45 minutes to an hour and, preferably, not exceeding about 25 minutes. The gel time may vary broadly from 5 minutes to 45 minutes or an hour but, preferably, varies between about 10 minutes and about 25 minutes.

It may be pointed out that gel time as herein used is the time that the resinous composition remains liquid prior to the initiation of gelling; in other words, when it is stated that the gel time should be 5 minutes, this means that the resinous composition should remain fluid for 5 minutes after the completion of the mixing of the reaction ingredients and that the resin component of the resinous composition begins to gel after the elapse of said period of 5 minutes. Usually is it desired that the gelling of the resinous component be delayed for a period anywhere from 10 to 25 minutes in order to allow for the gas to be produced and expand the reaction mass to at least four times its original volume. As will be pointed out in detail hereinafter, if the resin component of the resinous composition begins to gel very shortly after the gas-producing ingredients are added, then the resinous composition will set up or cure before the gas has had an opportunity to be produced and to perform its function of expanding the resinous composition.

In general it may be stated that any formaldehyde liberating agent may be used to set the resinous composition. However, the most advantageous results are obtained when the setting agent is a solution of monomeric formaldehyde in an agent which has a viscosity much greater than water and approximates the viscosity of glycerine.

If the setting agent were added as a solid material such as paraformaldehyde, its distribution would be more difficult, and considerable time would be required for its breakdown to the monomeric formaldehyde, thereby prolonging the gel time of the resin component of the resinous composition; that is, the time the resinous composition is fluid will be increased and the gas bubbles will escape. This again emphasizes the point that in accordance with the present invention after the gas-producing ingredients have been added, too long a time cannot elapse before the mass begins to gel and entraps the gas bubbles. If the time is too long, the gas bubbles escape from the resinous composition and defeat the entire object of the invention. It is, therefore, desirable that the formaldehyde be dissolved in solvents therefor which have a viscosity varying from about 3 centipoises and about 130 centipoises at 20° C. There are any number of solvents for formaldehyde which have this physical characteristic and which, therefore, are desirable as solvents for the formaldehyde or any of its equivalents which liberate formaldehyde. It is also desirable that the solvent for the formaldehyde have a boiling point above 248° F. This will prevent shrinkage of the resin composition inasmuch as the solvent for the setting agent does not evaporate within the cold range setting temperature; namely, about 40° F. to 120° F. and, preferably, 60° F. to 120° F. This reduces the shrinkage which is of considerable importance to the stability of the structure.

The solvent for the formaldehyde is preferably ethylene glycol. However, equivalent solvents may be used such as long chain monomeric alcohols typified by octyl alcohol, polyhydroxy alcohols, such as ethylene glycol, diethylene glycol or glycerine. Glycol ethers such as butyl Cellosolve, and the Carbitols, such as butyl Carbitol, diethylene glycol, monoethyl ether acetate, ethylene glycol diacetate, alicyclic alcohols, such as cyclohexanol, and terpineol. The setting agent may be prepared by mixing 60 parts of ethylene glycol with 40 parts of para-formaldehyde and refluxing until a clear solution is obtained.

Another example in accordance with the present invention is as follows:

*Example 2*

| | Grams |
|---|---|
| Copolymer phenol-resorcinol-formaldehyde permanently fusible resin containing 1 mol of phenol for each mol of resorcinol | 100 |
| Glycerine | 25 |
| Water | 25 |

Figure 10:
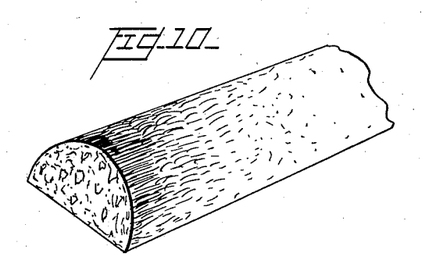
Fig. 10 is a perspective view of a portion of a strip of the composite material in which the bubbles are exceedingly small.

To 90 grams of this mixture there is added 25 grams of a 37% solution of formaldehyde in ethylene glycol and the two materials were stirred by means of a mechanical mixer for a period of five minutes. To this solution there is added with further stirring 5 grams of a paste prepared by mixing 6 grams of finely divided aluminum powder with 4 grams of butyl stearate. Finally 12 grams of commercial 85% phosphoric acid are added with stirring. The resulting mixture will expand approximately 10 times its original volume to give a material which is a very light extremely fine grained material and can be readily carved with wood carving implements. It is recommended for use by sculptors as a study medium out of which an object may be carved before the actual carving is made from stone or other material which is carved with much greater difficulty. A material of this character is shown in Figure 10.

The substance is superior in carving qualities to plaster of paris due to its greater resiliency and resistance to chipping and is superior to clay because of its greater rigidity.

The foam produced in this manner may also be used in the same manner and for the same purposes as that produced in accordance with Example 1, as for example as flotation for water craft, insulation for building construction and the like.

Instead of generating the gas-producing medium by the methods above set forth, the resin may have added thereto metallic hydrides, such as calcium hydride or lithium hydride, said hydrides reacting with water to liberate hydrogen which may be the ultimate bubble-producing agent. Further, a resin solution may have incorporated therein sodium carbide or calcium carbide which reacts with water to liberate acetylene gas.

A further example illustrating the present invention is as follows:

*Example 3*

Resorcinol-formaldehyde permanently fusible containing 0.7 gram oxalic acid per 100 grams of resin:

| | Grams |
|---|---|
| Resin | 100 |
| Glycerine | 30 |
| Water | 30 |

The above ingredients are thoroughly mixed at room temperature to provide a syrup to 100 grams of which there is added 25 grams of a 37% solution of formaldehyde in ethylene glycol. The resulting mixture is thoroughly stirred to give a homogeneous solution to which there is then added 3 grams of finely divided sodium bicarbonate. While the alkali gas generating agent is functioning stirring is continued. There is finally added, still with stirring, 5 grams of commercial 85% phosphoric acid which acts upon the sodium bicarbonate to produce bubbles of carbon dioxide gas throughout the resin and cause the mass to expand to at least 4 times its original volume. The permanently fusible resorcinol formaldehyde resin may be made by the following procedure:

| | Grams |
|---|---|
| Resorcinol | 600 |
| 37% formaldehyde solution | 300 |
| Solid oxalic acid crystals | 3.6 |
| Water | 15 |

The resorcinol is introduced into a kettle provided with a reflux condenser. To the resorcinol there is added approximately 150 grams or one half of the formaldehyde solution, and the mass is heated slightly until an exothermic reaction takes place. The mass is brought to reflux and the remaining 150 grams of formaldehyde are added. Refluxing is continued for about two hours at which point the oxalic acid dissolved in 15 grams of warm water are added. The mass is then substantially dehydrated by raising the temperature to 139° C. under 25 inches of vacuum. The resulting resinous material may then be handled in substantially the same manner as the copolymer phenol-resorcinol formaldehyde resin used in Example 1.

A further example illustrating the present invention is as follows:

*Example 4*

A mixture of a copolymer phenol-resorcinol-formaldehyde resin having a pH of 1.5 to 2 in a 50% water solution is mixed with glycerine and water in the following proportions:

| | Grams |
|---|---|
| Copolymer phenol resorcinol-formaldehyde permanently fusible resin containing 1 mol of phenol for each mol of resorcinol | 100 |
| Glycerine | 25 |
| Water | 25 |

The above ingredients are thoroughly mixed by heating the mixture until a smooth homogeneous solution is obtained. To the above syrup may be added 2 to 4 grams of glass fiber, but this is optional. To 90 grams of the mixture cooled to room temperature there is then added 25 grams of a 37% solution of formaldehyde in ethylene glycol with agitation and thereafter there is added 4 grams of ammonium carbonate with further stirring. The acidity of the resin is sufficient to cause evolution of carbon dioxide gas by reaction with the ammonium carbonate, with the result that the mixture will expand to 5 to 6 times its original volume and set to give a cured cellular composition.

The specific phenol resorcinol-formaldehyde permanently-fusible resin having one mol of phenol for each mol of resorcinol may be replaced by copolymer phenol resorcinol-aldehyde resins which are permanently fusible; that is, resins which have been formed by condensing the aldehyde and the phenolic body, the ratio of the aldehyde to the total phenolic body being less than 1:1, the ratio of the phenol to the resorcinol being different from that set forth in the example. In producing the copolymer phenol-resorcinol-aldehyde resin, the molecular quantity of phenol used with respect to the molecular quantity of resorcinol used is in the ratio of 1:1.

Figure 1:
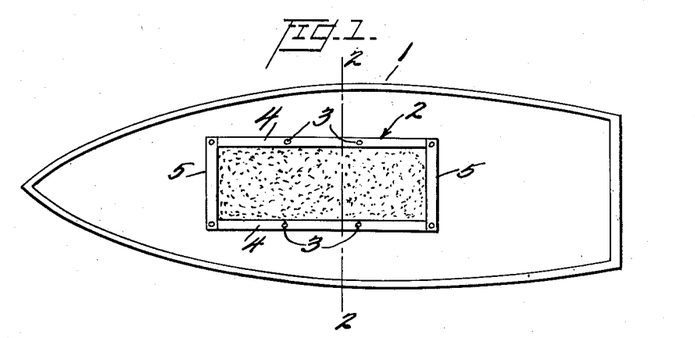
Fig. 1 is a plan view of a boat provided with a frame member.

As shown in Figure 1, a resin produced as herein set forth may be used to increase the buoyancy of watercraft, such as canoes, row boats, motor boats, and the like. As shown in Figure 1 the boat 1 is provided with a frame 2 which is secured to the bottom of the boat by screws 3, said frame being provided with side members 4 and end members 5.

Figure 2:
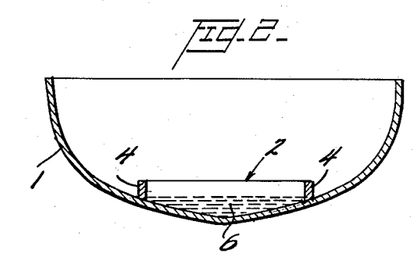
Fig. 2 is a transverse cross-sectional view taken on line 2—2 of Fig. 1 and showing the resin composition of the present invention containing gas-forming ingredients in its unexpanded state.
Figure 3:
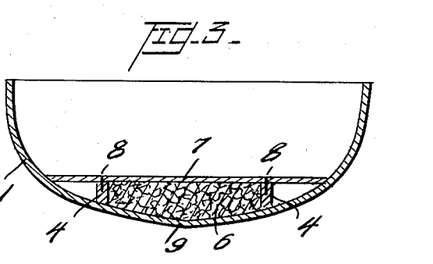
Fig. 3 is a transverse cross-sectional view of the boat showing the set expanded rigid resin composition of the present invention in place in the boat.

As shown in Figure 2 there has been poured into a frame a pourable mixture formulated in accordance with Example 1. In Figure 2 the mixture is identified by the numeral 6 and is in its unexpanded state. Usually enough of the expandable resin composition is poured into the frame 2 to provide an initial unexpanded layer about 3/8" thick. After the layer is introduced into the frame, preferably there is applied thereto a floor board 7, said floor board being secured to the side pieces 4 in a suitable manner as by pins or screws 8. The mass 6 then expands against the underside of the floor board 7 and fills up the space between the floor board 7 and the bottom 9 of the boat, the mass expanding from about 3/8" to about 3" in depth. In view of the fact that the resin adheres exceedingly well to wood and other cellulosic materials, the expanded resinous composition in its rigid hard state wherein it is capable of sustaining the weight of at least 150 to 500 lbs. per sq. in. is securely locked to the boat bottom and other structure and provides a relatively indestructible buoyant mass which is integrally a part of said boat.

Figure 4:
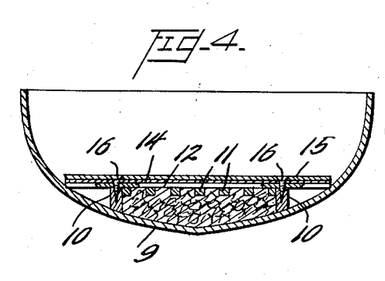
Fig. 4 is a transverse cross-sectional view of the boat provided with the expanded resin composition of the present invention in which there is embodied a floorboard frame.
Figure 5:
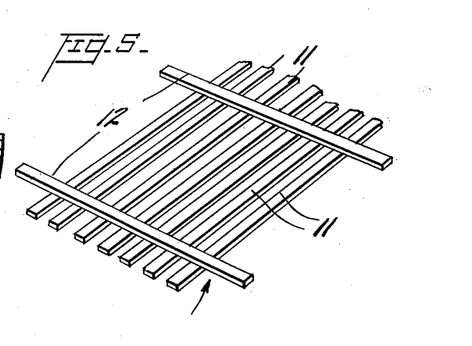
Fig. 5 is a perspective view of the floorboard member shown in Fig. 4.

In the form of the invention shown in Figures 4 and 5 the hull 9 of the boat has securely attached thereto a frame 10. A floor board member is constructed as shown in Figure 5 wherein parallel strips of wood 11 are held in space relationship by spaced cross members 12, said cross members 12 being united to members 11 in any suitable manner as by bolts or screws or wood adhesives. On the top surface of this frame identified as an entity by the numeral 13 there is provided a layer of cellophane 14, and on top of the cellophane there is provided a layer of plywood 15 as shown in Figure 4. The function of the cellophane will be clear from the following:

There is poured between the side walls of the frame 10 one of the resinous compositions herein set forth, and then there is applied to the side walls the unit shown in Figure 5 which is secured to the frame 10 in any suitable manner but preferably by screws 16 which can be removed later on. The resinous composition starts to gel within 15 to 25 minutes after it is poured. At the end of this time the plywood section designated by the number 15 in Figure 4 may be removed by unscrewing the screws 16. Due to the insertoin of the cellophane layer 14 between the plywood floor 15 and the expanded resin, it is possible to remove the temporary plywood floor 15 without destruction of the foam structure inasmuch as the cellophane prevents adhesion of the resin foam to the plywood. By standing at room temperature, that is, 40° F. to 120° F. for one to two days, the foam structure will cure to a rigid insoluble infusible expanded mass.

It is desired to point out, however, that said final cure may be effected within one to two hours by maintaining the foamed structure at 150° F. to 200° F.

Figure 6:
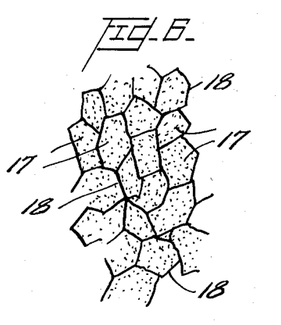
Fig. 6 is a fragmentary view setting forth the cellular structure of the expanded resin of the present invention, the resin film defining a discrete cavity.

As shown in Figure 6 the cells 17 are continuous, but unconnected, that is, around each cell or bubble of gas, there is a resin film 18 defining a discrete cavity.

Figure 7:
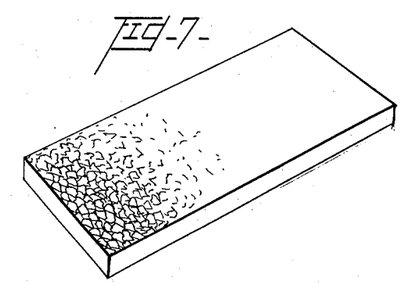
Fig. 7 is a perspective view of a slab of the expanded resin composition of the present invention, said slab being in a gel state capable of being formed or molded.
Figure 8:
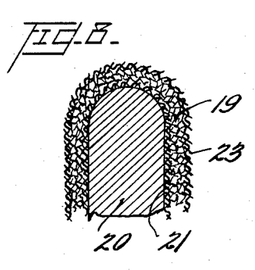
Fig. 8 is a sectional view setting forth the utilization of the formable slab shown in Fig. 7 in the production of a helmet or similar article.

As shown in Figures 7 and 8 a method is provided of making shaped articles from the resinous composition of the present invention.

As shown in Figure 7 a slab of expanded resin prepared in accordance with Example 1 is cast and allowed to stand for a period of 20 to 25 minutes until it is converted into a shapable or moulded form. In other words, the expanded mass is in a rubbery stage, that is, it has substantially completely gelled, but is in a formable or mouldable state. In other words, it has not obtained a rigid condition. It is capable of being shaped to any predetermined form.

In Figure 8 there is shown a form 20 suitable for moulding a helmet which after it is made is shatterproof. On the helmet form 20 there is spread a piece of cloth 21, and over the latter there is spread a sheet of the rubbery foamed material 19. Over the latter there is spread an additional layer of fabric 23 or cloth or any material which forms the final surface of the helmet. This composite structure is allowed to stand for a period of 1 to 2 days at room temperature 40° F. to 120° F. or a period of 1 to 2 hours at a temperature of 150° F. until the foamed material has cured to the infusible insoluble state at which time it is rigidly attached to the fabric layers constituting the inner and outer surface of the helmet.

Figure 9:
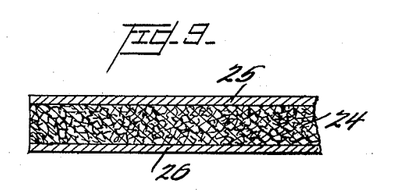
Fig. 9 is a cross-sectional view of a composite material wherein the expanded foamed resin composition of the present invention is used to produce a light-weight laminated structure.

A further application of the present invention is shown in Figure 9 wherein a layer of the rubbery foamed material is spread upon a sheet of plywood or wood veneer 26, and upon said foamed resin layer 24 is placed a second layer of plywood or wood veneer 25, thus defining a triple laminated structure. This structure is allowed to stand for a period of 1 to 2 days at room temperature 40° F. to 120° F. or is heated for 1 to 2 hours at 150° F. until the rigid infusible insoluble cured state of the foamed structure is obtained. At this time the resin will be rigidly adhered to the plywood or wood veneer layer.

In Example 2 the butyl stearate functions as a wetting agent, wetting the metal particles and thereby temporarily retarding the formation of gas bubbles. Any of the prior art wetting agents exerting little or no solvent action on the resin may be used, including diethylene glycol, monolaurate and similar fatty monoglycerides of the glycol esters.

The monohydric phenolic body used in carrying out the present invention may be illustrated by compounds such as phenol itself, $C_6H_5OH$, cresol, cresylic acid, xylenols and the like.

The terms "polyhydroxy benzene" and "dihydroxy benzene" are intended to include such compounds as resorcin, catechol, hydroquinone and phloroglucinol.

It is desired to point out that the permanently fusible copolymer resin may have a varying content of dihydroxy benzene and a varying content of monohydric phenol. The amount of dihydroxy benzene, as for example, resorcin, may vary from 25% resorcinol to 99% resorcinol, and, conversely, the percentage of monohydric phenol, as for example, phenol, $C_6H_5OH$, may vary from 75% to 1.0%, these percentages being taken on a molar basis. For example, 25% of resorcinol refers to 25% of the total molar phenolic body present. Thus, if 1 mol of phenol and 99 mols of resorcinol are reacted with 67 mols of formaldehyde, the phenol will represent 1% of the molar ratio and the resorcinol 99%. All the percentages herein set forth of the monohydroxy benzene and the dihydroxy benzene, respectively, present in the final reaction composition are based upon the molar relationship which is exemplified by the above disclosure.

It is desired to point out that numerous organic or inorganic materials may be used as fillers in the cellular resinous compositions. The amounts of said filler materials may vary from 0.25% to 20% of the resin solids in the composition.

Generally the incorporation of organic or inorganic fibrous or filamentary materials provides the most useful properties. Examples of organic fibrous fillers are walnut shell flour, cotton linters, wood flour, alpha cellulose, and the like. Examples of inorganic fillers are asbestos fibers, glass fibers, mica, carbon black, and the like. It has been discovered that the incorporation of such filler materials serves to increase the strength and improve moisture resistance of the foam, and, in the case of the organic fillers, the cellular composition is more effectively bonded with adhesive bonding compositions.

The pH measurements herein set forth are obtained by means of a Beckmann standard pH meter equipped with glass electrodes capable of use in either acid or alkaline media. The measurements are made by inserting the glass electrode and the calomel electrode simultaneously in the resin reaction solution containing the gas producing agents or into the resin solution. The dial is read while the instrument is electrically balanced.

The resinous foaming medium of the present invention may be made by mixing 60% to 75% of the permanently fusible resin herein set forth with 10% to 25% of the gas retarder ingredients herein set forth and 0.5% to 3% of the gas producing ingredients. The preferred ranges are 65% to 75% of the resin, 16% to 20% of the retarder, and 1% to 2% of the gas producing agent.

The amount of aldehydic setting agent required to set the foamed resinous composition may vary from 0.5% to 20% of the weight of the permanently fusible resin. The preferred range is 5% to 15% of the weight of the resin.

I claim:

1. The method of producing a cellular composition comprising forming a water-containing mixture of a permanently fusible dihydric phenol-formaldehyde-containing resin, the ratio of the aldehyde to the total phenolic body being less than 1:1, the dihydric phenol being selected from the group consisting of resorcinol, catechol and hydroquinone; and a solution of a formaldehyde setting agent, said solution having a viscosity between 3 and 130 centipoises at 20° C.; delaying the gel-forming reaction in the resinous mass by having present therein an organic retarder selected from the group consisting of unsubstituted polyhydric and monohydric alcohols and partial alkyl ethers of unsubstituted polyhydric alcohols which simultaneously prevents gas bubbles subsequently generated in the resinous mass from escaping during the time the mixture is in a liquid state and prior to the time the resinous mass has attained a substantial gelled structure, generating gas bubbles in the resinous mass, shortening the gel time of the resinous mass with respect to the time of the gas forming reaction by maintaining the pH of the resinous mass outside of the range of 2.5 to 6, and setting the resinous mass at a temperature varying between 60° and 120° F. prior to the escape of the gas bubbles.

2. The method of producing a cellular composition comprising forming a water-containing mixture of a permanently fusible dihydric phenol-formaldehyde-containing resin, the ratio of the aldehyde to the total phenolic body being less than 1:1, the dihydric phenol being selected from the group consisting of resorcinol, catechol and hydroquinone; and a solution of a formaldehyde setting agent, said solution having viscosity between 3 and 130 centipoises at 20° C.; the solvent for the aldehyde setting agent having a boiling point above 248° F., delaying the gel-forming reaction in the resinous mass by having present therein an organic retarder which simultaneously prevents gas bubbles subsequently generated in the resinous mass from escaping during the time the mixture is in a liquid state and prior to the time the resinous mass has attained a substantial gelled structure, said retarder being selected from the group consisting of unsubstituted polyhydric and monohydric alcohols and partial alkyl ethers of unsubstituted polyhydric alcohols generating gas bubbles in the resinous mass, shortening the gel time of the resinous mass with respect to the time of the gas forming reaction by maintaining the pH of the resinous mass outside of the range of 2.5 to 6, and setting the resinous mass at a temperature varying between 60° and 120° F. prior to the escape of the gas bubbles.

3. The method of producing a cellular composition comprising forming a water-containing mixture of a permanently fusible dihydric phenol-formaldehyde-containing resin, the ratio of the aldehyde to the total phenolic body being less than 1:1, the dihydric phenol being selected from the group consisting of resorcinol, catechol and hydroquinone; a solution of a formaldehyde setting agent, said solution having a viscosity between 3 and 130 centipoises at 20° C.; delaying the gel-forming reaction in the resinous mass by having present therein an organic retarder selected from the group consisting of unsubstituted polyhydric and monohydric alcohols and partial alkyl ethers of unsubstituted polyhydric alcohols, which simultaneously prevents gas bubbles subsequently generated in the resinous mass from escaping during the time the mixture is in a liquid state and prior to the time the resinous mass has attained a substantial gelled structure, generating gas bubbles in the resinous mass, shortening the gel time of the resinous mass to between about 5 minutes and about 60 minutes by maintaining the pH of the resinous mass outside of the range of 2.5 to 6, and setting the resinous mass at a temperature varying between 60° and 120° F. prior to the escape of the gas bubbles.

4. The method of claim 1 in which the dihydric phenol is resorcinol.

5. The method of claim 2 in which the dihydric phenol is resorcinol.

6. The method of claim 3 in which the dihydric phenol is resorcinol.

7. The method of producing a cellular composition comprising forming a water-containing mixture of a permanently fusible copolymer condensation product of a monohydric phenol selected from the group consisting of phenol, cresol, cresylic acid and xylenol; a dihydric phenol selected from the group consisting of resorcinol, catechol and hydroquinone; and formaldehyde, the dihydric phenol being at least 25% of the total molar phenolic body; a solution of a formaldehyde setting agent, said solution having a viscosity between 3 and 130 centipoises at 20° C.; delaying the gel-forming composition in the resinous mass by having present therein an organic retarder selected from the group consisting of unsubstituted polyhydric and monohydric alcohols and partial alkyl ethers of unsubstituted polyhydric alcohols which simultaneously prevents gas bubbles subsequently generated in the resinous mass from escaping during the time the mixture is in a liquid state and prior to the time the resinous mass has attained a substantial gelled structure; generating gas bubbles in the resinous mass; shortening the gel time of the resinous mass with respect to the time of the gas forming reaction by maintaining the pH of the resinous mass outside of a pH range varying between 2.5 and 6; and setting the resinous mass at a temperature varying between 60° and 120° F. prior to the escape of the gas bubbles.

8. The method of producing a cellular composition comprising forming a water-containing mixture of a permanently fusible copolymer condensation product of a monohydric phenol selected from the group consisting of phenol, cresol, cresylic acid and xylenol; a dihydric phenol selected from the group consisting of resorcinol, catechol and hydroquinone; and a formaldehyde, the dihydric phenol being at least 25 per cent of the total molar phenolic body, and a solution of a formaldehyde setting agent, said solution having a viscosity between 3 and 130 centipoises at 20° C., delaying the gel-forming reaction in the resinous mass by having present therein an organic retarder selected from the group consisting of unsubstituted polyhydric and monohydric alcohols and partial alkyl ethers of unsubstituted polyhydric alcohols, which simultaneously prevents gas bubbles subsequently generated in the resinous mass from escaping during the time the mixture is in a liquid state and prior to the time the resinous mass has attained a substantial gelled structure, generating gas bubbles in the resinous mass, shortening the gel time of the resinous mass to between about 5 minutes and about 60 minutes by maintaining the pH of the resinous mass outside of a pH range varying between 2.5 and 6; and setting the resinous mass at a temperature varying between 60° and 120° F. prior to the escape of the gas bubbles.

9. The method of claim 7 in which the dihydric phenol is resorcinol.

10. The method of claim 8 in which the dihydric phenol is resorcinol and the aldehyde setting agent is formaldehyde.

11. The method of claim 7 in which the solvent for the aldehyde setting agent has a boiling point above 248° F. to thereby inhibit shrinkage of the cellular composition during setting.

12. The method of claim 2 in which the gas retarder is glycerine.

13. The method of claim 7 in which the gas retarder is glycerine.

14. The method of producing a cellular composition comprising forming a water-containing mixture of a permanently fusible copolymer condensation product of a monohydric phenol selected from the group consisting of phenol, cresol, cresylic acid and xylenol; a dihydric phenol selected from the group consisting of resorcinol, catechol and hydroquinone; and formaldehyde; the dihydric phenol being at least 25% of the total molar phenolic body a solution of a formaldehyde setting agent, said solution having a viscosity between 3 and 130 centipoises at 20° C., delaying the gel-forming composition in the resinous mass by having present therein an organic retarder selected from the group consisting of unsubstituted polyhydric and monohydric alcohols and partial alkyl ethers of unsubstituted polyhydric alcohols which simultaneously prevents gas bubbles subsequently generated in the resinous mass from escaping during the time the mixture is in a liquid state and prior to the time the resinous mass has attained a substantial gelled structure, generating gas bubbles in the resinous mass in the presence of butyl stearate wetting agent, shortening the gel time of the resinous mass to between about 5 minutes and about 60 minutes by maintaining the pH of the resinous mass outside of a pH range varying between 2.5 and 6; and setting the resinous mass at a temperature varying between 60° and 120° F. prior to the escape of the gas bubbles.

15. The method of producing a cellular article comprising forming a water-containing mixture of a permanently fusible dihydric phenol-formaldehyde-containing resin, the ratio of the aldehyde to the total phenolic body being less than 1:1, the dihydric phenol being selected from the group consisting of resorcinol, catechol and hydroquinone; a solvent solution of a formaldehyde setting agent, said solvent having a viscosity between 3 and 130 centipoises at 20° C.; delaying the gel-forming reaction in the resinous mass by having present therein an organic retarder selected from the group consisting of unsubstituted polyhydric and monohydric alcohols and partial alkyl ethers of unsubstituted polyhydric alcohols, which simultaneously prevents gas bubbles subsequently generated in the resinous mass from escaping during the time the mixture is in a liquid state and prior to the time the resinous mass has attained a substantial gelled structure, generating gas bubbles in the resinous mass, shortening the gel time of the resinous mass to between about 5 minutes and about 60 minutes by maintaining the pH of the resinous mass outside of a pH range varying between 2.5 and 6, said mixture being reacted until the reaction mass attains a gelled rubbery state, thereafter forming a shaped article therefrom while the resinous mass is in a rubbery state, and thereafter converting the gelled rubbery shaped article to a rigid state.

16. The method of producing a cellular article comprising forming a water-containing mixture of a permanently fusible copolymer condensation product of a monohydric phenol selected from the group consisting of phenol, cresol, cresylic acid and xylenol; a dihydric phenol selected from the group consisting of resorcinol, catechol and hydroquinone; and formaldehyde; the dihydric phenol being at least 25% of the total molar phenolic body, a solvent solution of a formaldehyde setting agent, said solvent having a viscosity between 3 and 130 centipoises at 20° C., delaying the gel-forming composition in the resinous mass by having present therein an organic retarder selected from the group consisting of unsubstituted polyhydric and monohydric alcohols and partial alkyl ethers of unsubstituted polyhydric alcohols, which simultaneously prevents gas bubbles subsequently generated in the resinous mass from escaping during the time the mixture is in a liquid state and prior to the time the resinous mass has attained a substantial gelled structure, generating gas bubbles in the resinous mass, shortening the gel time of the resinous mass to between about 5 minutes and about 60 minutes by maintaining the pH of the resinous mass outside of a pH range varying between 2.5 and 6, said mixture being reacted until the reaction mass attains a gelled rubbery state, thereafter forming a shaped article therefrom while the resinous mass is in a rubbery state, and thereafter converting the gelled rubbery shaped article to a rigid state.

17. The method of producing a cellular composition comprising forming a water-containing mixture of a permanently fusible resorcinol-formaldehyde-containing resin, the ratio of the aldehyde to the total phenolic body being less than 1:1; and a formaldehyde-setting agent dissolved in ethylene glycol; delaying the gel-forming reaction in the resinous mass by having present glycerine which simultaneously prevents gas bubbles subsequently generated in the resinous mass from escaping during the time the mixture is in a liquid state and prior to the time the resinous mass has attained a substantially gelled structure, generating gas bubbles in the resinous mass, shortening the gel-time of the resinous mass with respect to the time of the gas-forming reaction by maintaining the pH of the resinous mass outside of a pH range of between about 2.5 and about 6.0, and setting the resinous mass at a temperature varying between about 60° and about 120° F. prior to the escape of the gas bubbles.

18. The method of producing a cellular composition comprising forming a water-containing mixture of a permanently fusible resorcinol-formaldehyde-containing resin, the ratio of the aldehyde to the total phenolic body being less than 1:1; and a formaldehyde-setting agent dissolved in ethylene glycol; delaying the gel-forming reaction in the resinous mass by having present glycerine which simultaneously prevents gas bubbles subsequently generated in the resinous mass from escaping during the time the mixture is in a liquid state and prior to the time the resinous mass has attained a substantially gelled structure, generating gas bubbles in the resinous mass, shortening the gel-time of the resinous composition to between about 5 minutes and about 60 minutes by maintaining the pH of the resinous mass outside of a pH range between about 2.5 and about 6.0, and setting the resinous mass at a temperature varying between about 60° and about 120° F. prior to the escape of the gas bubbles.

19. The method of producing a cellular composition comprising forming a water-containing mixture of a permanently fusible resorcinol-formaldehyde-containing resin, the ratio of the aldehyde to the total phenolic body being less than 1:1; and a formaldehyde-setting agent dissolved in ethylene glycol; delaying the gel-forming reaction in the resinous mass by having present glycerine which simultaneously prevents gas bubbles subsequently generated in the resinous mass from escaping during the time the mixture is in a liquid state and prior to the time the resinous mass has attained a substantially gelled structure, generating gas bubbles in the resinous mass in the presence of a butyl stearate wetting agent acting as an auxiliary temporary retarder, shortening the gel-time of the resinous mass with respect to the time of the gas-forming reaction by maintaining the pH of the resinous mass outside of a pH range between about 2.5 and about 6.0, and setting the resinous mass at a temperature varying between about 60° and about 120° F. prior to the escape of the gas bubbles.

20. The method of producing a cellular composition comprising forming a water-containing mixture of a permanently fusible resorcinol-formaldehyde-containing resin, the ratio of the aldehyde to the total phenolic body being less than 1:1; and a formaldehyde-setting agent dissolved in ethylene glycol; delaying the gel-forming reaction in the resinous mass by having present glycerine which simultaneously prevents gas bubbles subseqently generated in the resinous mass from escaping during the time the mixture is in a liquid state and prior to the time the resinous mass has attained a substantially gelled structure, generating gas bubbles in the resinous mass in the presence of a butyl stearate retarder, shortening the gel time of the resinous composition to between about 5 minutes and about 60 minutes by maintaining the pH of the resinous mass outside of a pH range between about 2.5 and about 6.0 and setting the resinous mass in a temperature varying between about 60° and about 120° F. prior to the escape of the gas bubbles.

21. The method of claim 19, in which the organic retarder is ethylene glycol.

22. The method of claim 20 in which the organic retarder is diethylene glycol.

23. The method of claim 20 in which the organic retarder is cyclohexanol.

24. The method of claim 20 in which the organic retarder is a glycerol ether.

ROBERT JACOB BRINKEMA.

REFERENCES CITED

The following references are of record in the file of this patent:

UNITED STATES PATENTS

| Number | Name | Date |
|---|---|---|
| 1,776,366 | Novotny | Sept. 23, 1930 |
| 1,856,294 | Rice | May 3, 1932 |
| 2,414,415 | Rhodes | Jan. 14, 1947 |
| 2,443,197 | Rhodes | June 15, 1948 |
| 2,461,761 | Nye | Feb. 15, 1949 |

FOREIGN PATENTS

| Number | Country | Date |
|---|---|---|
| 571,284 | Great Britain | Aug. 17, 1945 |